US010910785B2

(12) United States Patent
Motowaki

(10) Patent No.: US 10,910,785 B2
(45) Date of Patent: Feb. 2, 2021

(54) CONNECTOR-CONNECTING JIG

(71) Applicant: Fanuc Corporation, Yamanashi (JP)

(72) Inventor: Yoshio Motowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 173 days.

(21) Appl. No.: 16/393,617

(22) Filed: Apr. 24, 2019

(65) Prior Publication Data

US 2019/0386446 A1 Dec. 19, 2019

(30) Foreign Application Priority Data

Jun. 14, 2018 (JP) ................................ 2018-113641

(51) Int. Cl.
*B23P 19/00* (2006.01)
*H01R 43/26* (2006.01)
*H01R 12/79* (2011.01)

(52) U.S. Cl.
CPC ............ *H01R 43/26* (2013.01); *H01R 12/79* (2013.01); *Y10T 29/53174* (2015.01)

(58) Field of Classification Search
CPC ........ H01R 43/26; H01R 12/79; H01R 12/00; H01R 43/20; B25J 9/1607; Y10T 29/4913; Y10T 29/5313; Y10T 29/53174; Y10T 29/53209
USPC .................................................. 29/739, 747
See application file for complete search history.

(56) References Cited

U.S. PATENT DOCUMENTS

| | | | | |
|---|---|---|---|---|
| 8,977,395 | B2 * | 3/2015 | Negishi | B25J 9/1607 700/251 |
| 10,770,857 | B2 * | 9/2020 | Kobayashi | H01R 12/00 |
| 10,826,262 | B2 * | 11/2020 | Takano | H01R 43/26 |
| 2012/0197438 | A1 | 8/2012 | Ogami | |

FOREIGN PATENT DOCUMENTS

| | | | |
|---|---|---|---|
| JP | 2002-75583 | A | 3/2002 |
| JP | 2009-182213 | A | 8/2009 |
| JP | 2011-115877 | A | 6/2011 |

* cited by examiner

*Primary Examiner* — Donghai D Nguyen
(74) *Attorney, Agent, or Firm* — Shackelford, Bowen, McKinley & Norton, LLP

(57) ABSTRACT

A connector-connecting jig used to connect a first connector disposed at one end of a strip-shaped flexible cable, which has another end fixed to a bottom surface of a housing-shaped electronic device body, to a second connector on a substrate. The first connector is disposed on a surface of the flexible cable opposite to said bottom surface. The connector-connecting jig includes a base having a placement surface on which the electronic device body is placed; a body fixing unit that fixes the electronic device body onto the placement surface; and a connector supporting member that extends over the electronic device body and contacts a surface of the flexible cable on a rear surface side of the first connector when the flexible cable is lifted upward from said bottom surface of the electronic device body fixed onto the placement surface.

4 Claims, 8 Drawing Sheets

CONNECTOR-CONNECTING JIG

This application is based on Japanese Patent Application No. 2018-113641, the contents of which are incorporated herein by reference.

TECHNICAL FIELD

The present invention relates to a connector-connecting jig.

Conventionally, the task of connecting an ultra-compact connector fixed to an end of a short flexible cable disposed inside a small-size electronic device body to a connector on a substrate equipped with electronic parts has been manually carried out.

SUMMARY OF INVENTION

An aspect of the present invention provides a connector-connecting jig used to connect a first connector disposed at one end of a strip-shaped flexible cable, which has another end fixed to a bottom surface of a housing-shaped electronic device body, to a second connector on a substrate to be housed in the electronic device body. The first connector is disposed on a surface of the flexible cable opposite to said bottom surface when the flexible cable is in a housed state in which the flexible cable extends along said bottom surface. The connector-connecting jig includes a base having a placement surface on which the electronic device body is placed; a body fixing unit that fixes the electronic device body onto the placement surface so that the electronic device body is in a positioned state; and a connector supporting member that extends over the electronic device body with a space therebetween and contacts a surface of the flexible cable on a rear surface side of the first connector when the flexible cable is lifted upward from said bottom surface of the electronic device body fixed onto the placement surface.

In the aspect described above, the connector supporting member may be rotatably supported by the base about an axis extending in a direction intersecting said bottom surface so that, when rotated, the connector supporting member comes above the electronic device body and between said bottom surface and the surface of the flexible cable on the rear surface side of the first connector.

In the aspect described above, the connector supporting member may be movable along said axis and may have a supporting surface that is inclined in one direction with respect to the axis and contacts the surface of the flexible cable on the rear surface side of the first connector. In addition, when the connector supporting member is to be rotated about the axis, the connector supporting member may be moved to a position remote from the placement surface, and when the connector supporting member is to make contact with the flexible cable, the connector supporting member may be placed at a position where the connector supporting member contacts the placement surface.

In the aspect described above, the connector-connecting jig may further include a pushing member that pushes the first connector along an oblique direction with respect to the supporting surface of the connector supporting member so that the surface of the flexible cable on the rear surface side of the first connector contacts the supporting surface, and a locating surface formed in the connector supporting member and extending in a direction intersecting the supporting surface so that the pushed first connector abuts against the locating surface.

DESCRIPTION OF EMBODIMENTS

A connector-connecting jig 1 according to one embodiment of the present invention will now be described with reference to the drawings.

Figure 1:
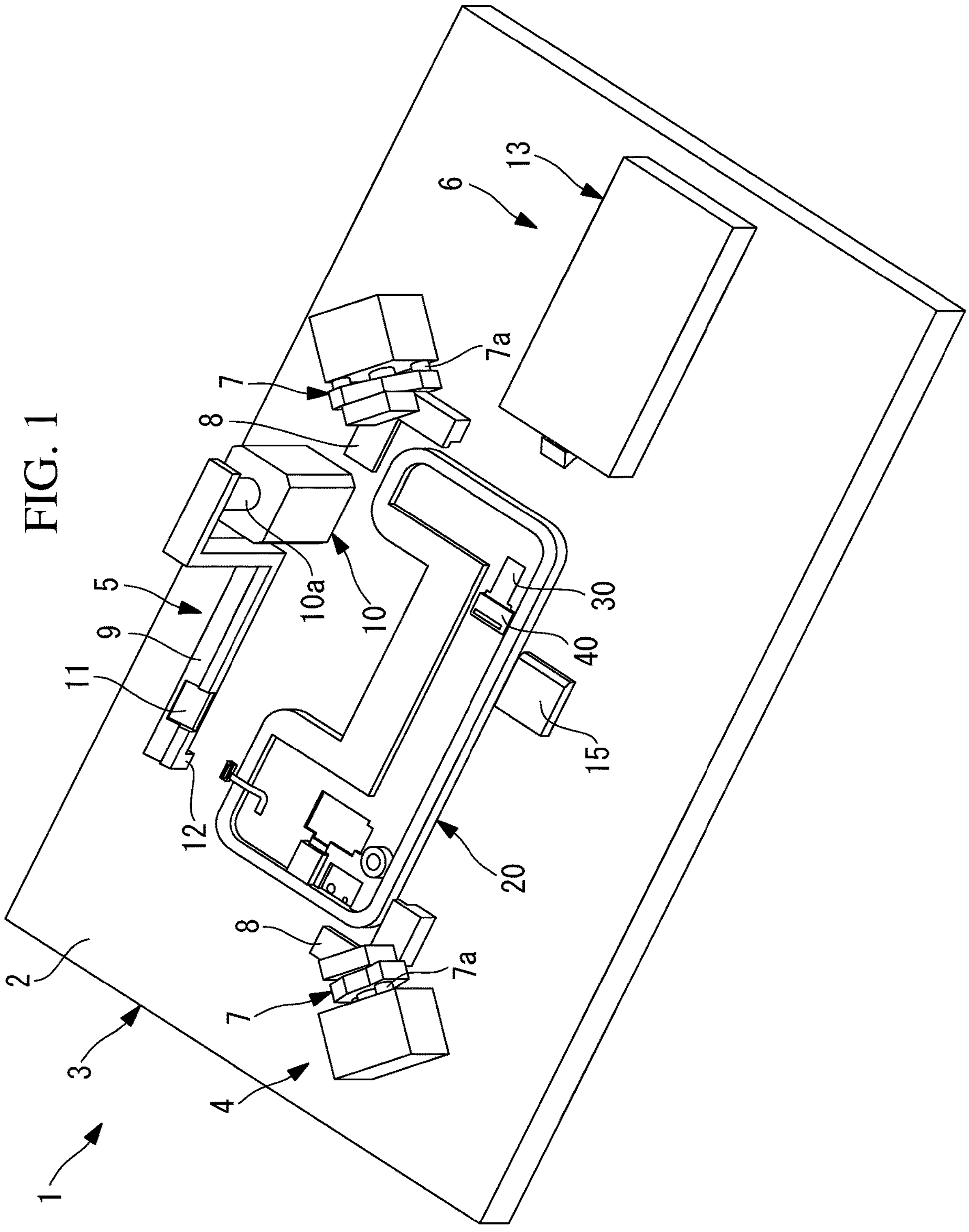
FIG. 1 is a perspective view of a connector-connecting jig according to one embodiment of the present invention.

The connector-connecting jig 1 of the present embodiment is used to connect a first connector 40 disposed at one end of a strip-shaped flexible cable 30 having the other end fixed to a bottom surface of a housing-shaped electronic device casing (electronic device body) 20, as illustrated in FIG. 1, to a second connector 60 on a substrate 50 to be housed in the electronic device casing 20.

As illustrated in FIG. 1, the first connector 40 is disposed on a surface of the flexible cable 30, which extends along the bottom surface of the electronic device casing 20 when in a housed state, the surface being opposite of this bottom surface.

As illustrated in FIG. 1, the connector-connecting jig 1 of the present embodiment is equipped with a base 3 having a horizontal placement surface 2 on which the electronic device casing 20 is placed, a casing fixing unit (body fixing unit) 4 that fixes the electronic device casing 20 onto the placement surface 2 so that the electronic device casing 20 is in a positioned state, a connector supporting unit 5 that supports the first connector 40 when the first connector 40 is connected to the second connector 60 on the substrate 50, and a connector positioning unit 6 that positions the first connector 40 supported by the connector supporting unit 5.

The casing fixing unit 4 is equipped with a pair of cylinders 7 that press a pair of opposing corner positions of the electronic device casing 20 placed on the placement surface 2 of the base 3 in directions opposite to each other. An L-shaped holder 8 that holds a corner of the electronic device casing 20 is disposed at the tip of a rod 7*a* of each cylinder 7.

The connector supporting unit 5 is equipped with a connector supporting member 9 extending in the horizontal direction, and a clamp cylinder 10 that rotatably supports the connector supporting member 9 about the perpendicular axis. The clamp cylinder 10 is fixed to the placement surface 2 of the base 3 with a rod 10*a* facing perpendicularly upward, and the connector supporting member 9 can be moved in the perpendicular direction by moving the rod 10*a* in the perpendicular axis direction.

Figure 2:
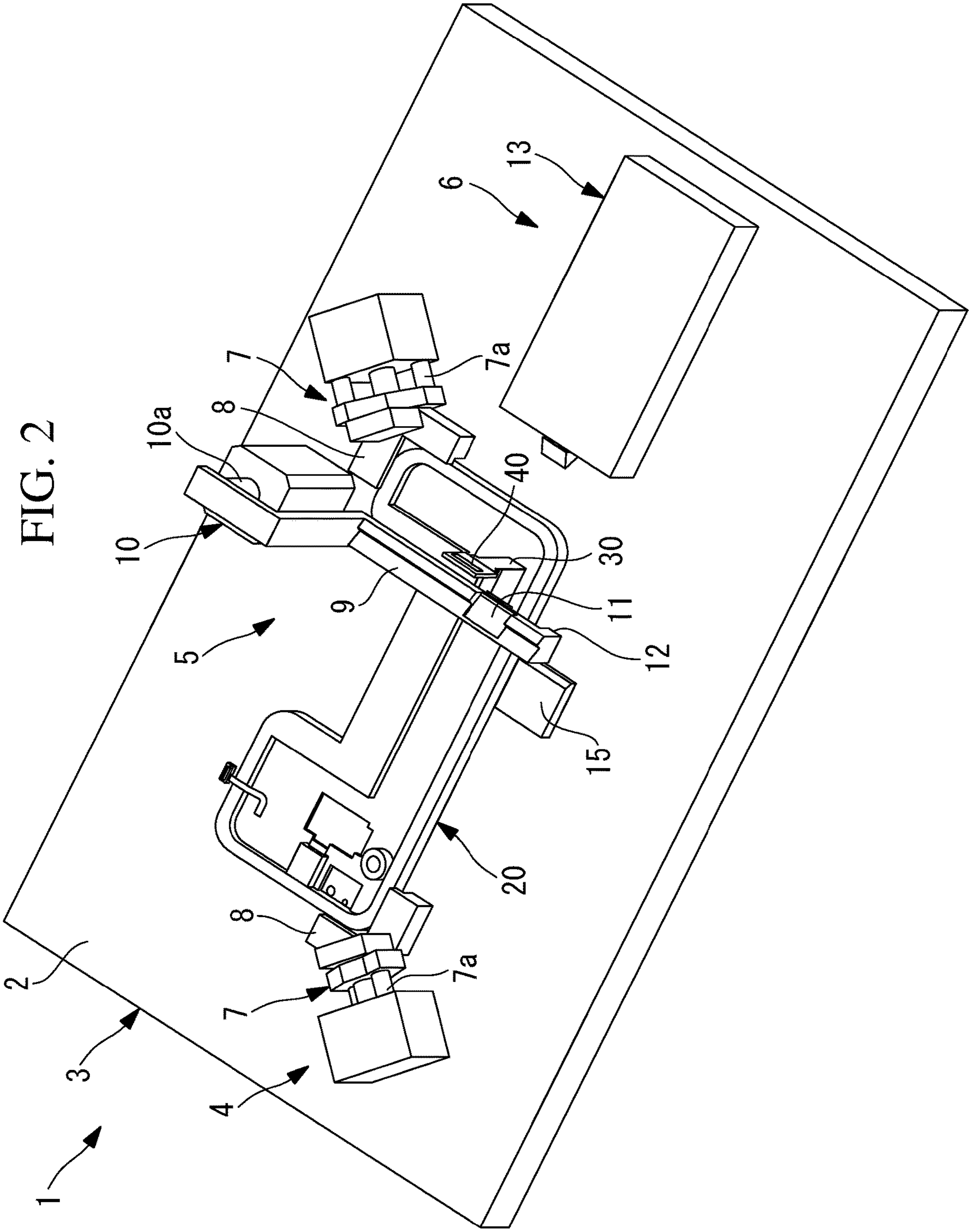
FIG. 2 is a perspective view of the connector-connecting jig illustrated in FIG. 1, and illustrates a state in which a connector supporting unit is rotated by a clamp cylinder.

When the clamp cylinder 10 is actuated, the connector supporting member 9 rotates 90° about the perpendicular axis of the rod 7*a* and moves back and forth between a retracted position beside the electronic device casing 20, as illustrated in FIG. 1, and a mounting position above the electronic device casing 20, as illustrated in FIG. 2.

The connector supporting member 9 has a size such that the connector supporting member 9 traverses the electronic device casing 20 in the width direction when rotated to the mounting position by actuating the clamp cylinder 10 while the flexible cable 30 inside the electronic device casing 20 fixed and positioned by the casing fixing unit 4 is lifted upward. The connector supporting member 9 has a contact surface (supporting surface) 11 with which the surface of the flexible cable 30 on the rear surface side of the first connector 40 makes contact when the flexible cable 30, which has been lifted upward, is laid flat while the connector supporting member 9 is at the mounting position.

A leg 12 that extends toward the placement surface 2 is disposed at the tip of the connector supporting member 9. When the clamp cylinder 10 is actuated to move the connector supporting member 9 closer to the base 3 along the axis, the leg 12 at the tip of the connector supporting member 9 hits the placement surface 2 and blocks further movement. As a result, the connector supporting member 9 is supported by the leg 12 and the rod 10*a* of the clamp cylinder 10 so as to be in a double-supported beam shape, and extends over the electronic device casing 20 with a space therebetween.

The connector positioning unit 6 is constituted by the contact surface 11 of the connector supporting member 9, a locating surface 14 adjacent to the contact surface 11, and a pusher cylinder (pushing member) 13 fixed to the base 3. The pusher cylinder 13 is equipped with a rod 13*a* that can be advanced and retracted horizontally along a direction substantially orthogonal to the connector supporting member 9 disposed at the mounting position.

Figure 3:
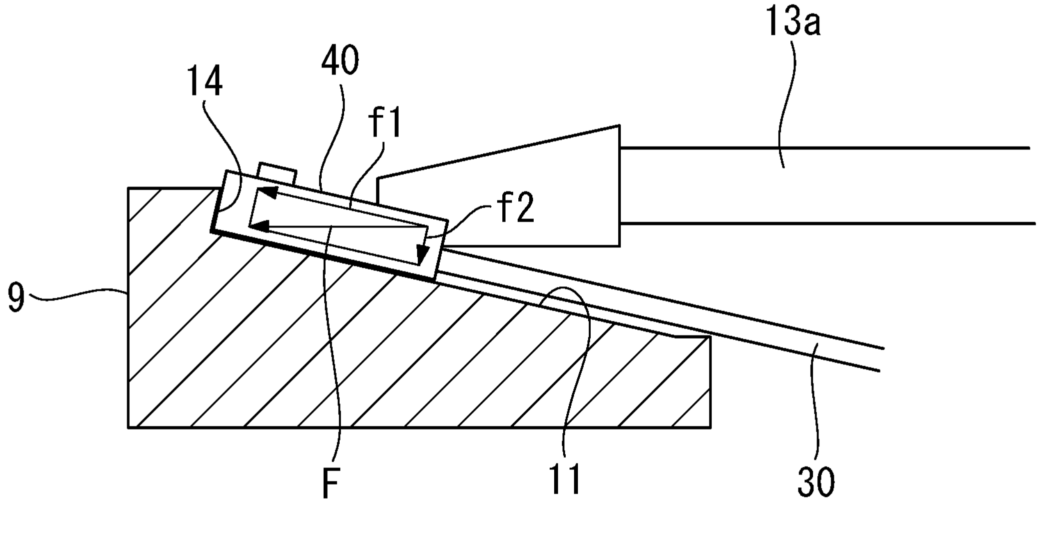
FIG. 3 is a side view illustrating a state in which a first connector is placed on a contact surface and is pushed by a pusher cylinder in the state illustrated in FIG. 2.

As illustrated in FIG. 3, the contact surface 11 has a rising slope with respect to the placement surface 2 of the base 3 away from the pusher cylinder 13 along the protraction-retraction direction of the rod 13*a* of the pusher cylinder 13 when the connector supporting member 9 is at the mounting position. The locating surface 14 is at the highest position of the slope of the contact surface 11, and extends in a direction orthogonal to the contact surface 11.

A projection 15 against which the leg 12 abuts in the horizontal direction is disposed on the placement surface 2 of the base 3 on the side opposite the pusher cylinder 13 when the leg 12 of the connector supporting member 9 at the mounting position is in contact with the placement surface 2. The projection 15 has a height such that, when the space between the placement surface 2 and the leg 12 is maximally expanded, the projection 15 is lower than the lower surface of the leg 12.

The operation of the connector-connecting jig 1 having such features will now be described.

In order to connect the second connector 60 on the substrate 50 to the first connector 40 of the flexible cable 30 by using a robot and the connector-connecting jig 1 of the present embodiment, as illustrated in FIG. 1, the clamp cylinder 10 is actuated to place the connector supporting member 9 at the retracted position.

Next, the electronic device casing 20 is placed on the placement surface 2 of the base 3, and two cylinders 7 of the casing fixing unit 4 are actuated to push the holders 8 at the tips of the rods 7*a* of the cylinders 7 against the two diagonally opposing corners of the electronic device casing 20, as illustrated in FIG. 2. In this manner, the electronic device casing 20 is fixed onto the placement surface 2 of the base 3 so as to be in a positioned state.

In this state, as illustrated in FIG. 2, a vacuum means (not illustrated) of a robot (not illustrated) suctions and lifts the flexible cable 30 in the electronic device casing 20.

Next, as illustrated in FIG. 2, the clamp cylinder 10 of the connector supporting unit 5 is actuated to rotate the connector supporting member 9 about the perpendicular axis and bring the connector supporting member 9 to the mounting position. As a result, the connector supporting member 9 passes over the projection 15 of the base 3 and straddles the electronic device casing 20 in the width direction.

Then, the clamp cylinder 10 is actuated to move the connector supporting member 9 in the perpendicular axis direction and bring the leg 12 at the tip of the connector supporting member 9 into contact with the placement surface 2 of the base 3. As a result, the connector supporting member 9 extends over the electronic device casing 20 with a space therebetween so as to straddle the electronic device casing 20 in the width direction. Thus, when suction by the robot is released to lay the flexible cable 30 flat, the surface of the flexible cable 30 on the rear surface side of the first connector 40 makes contact with the contact surface 11 of the connector supporting member 9 as illustrated in FIG. 3.

In this state, the pusher cylinder 13 is actuated to push the first connector 40 with the tip of the rod 13*a* of the pusher cylinder 13. Since the pusher cylinder 13 causes a pressing force F to act in the horizontal direction and the contact surface 11 is inclined with respect to the horizontal plane, the rear surface of the first connector 40 pushed by the pusher cylinder 13 is brought into contact with the contact surface 11 to set the position of the first connector 40 in the height direction. The first connector 40 pushed by the pusher cylinder 13 slides on the contact surface 11 and abuts against the locating surface 14 orthogonal to the contact surface 11. Thus, the position of the first connector 40 is set in the longitudinal direction of the flexible cable 30 also.

Figure 4:
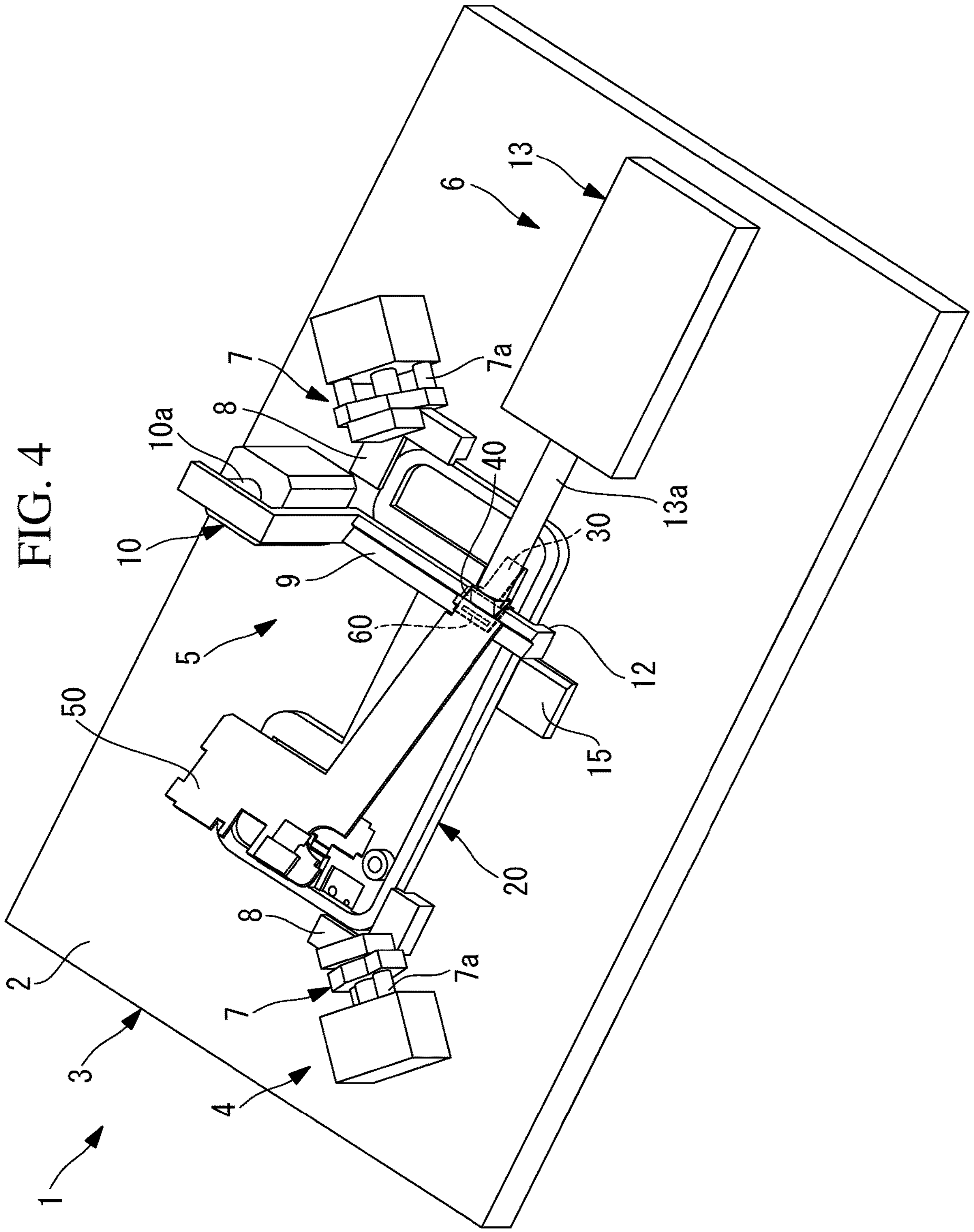
FIG. 4 is a perspective view illustrating a state in which a second connector is connected to the first connector positioned as illustrated in FIG. 3.

Thus, as illustrated in FIG. 4, the first connector 40 and the second connector 60 can be connected to each other by pushing the second connector 60 on the substrate 50 grasped by a robot (not illustrated) against the first connector 40 fixed so as to be in the positioned state.

In this case, since the rear surface of the first connector 40 is supported by the connector supporting member 9, an insertion force can be reliably applied to the second connector 60, and a connection can be established more reliably. In other words, for example, the insertion force can be more accurately administered by using a force sensor installed in the robot, and more reliable connecting work can be performed.

Since the connector supporting member 9 extends over the electronic device casing 20 with a space therebetween, the pressing force from the robot is not transmitted to the electronic device casing 20, and the integrity of the electronic device casing 20 can be ensured.

Since the leg 12 is in contact with the placement surface 2 of the base 3, the connector supporting member 9 does not slip downward even when the pressing force from the robot is applied, and an insertion force can be reliably applied between the first connector 40 and the second connector 60.

Since the contact surface 11 is inclined with respect to the protraction-retraction direction of the rod 13*a* of the pusher cylinder 13 that sets the position of the first connector 40, the position of the first connector 40 can be set in two directions. Thus, the structure of the connector-connecting jig 1 can be simplified.

There is also an advantage in that since the leg 12 abuts against the projection 15 on the base 3, the connector supporting member 9 pushed by the pusher cylinder 13 is reliably prevented from rotating about the perpendicular axis, and the position of the first connector 40 can be more reliably set.

Figure 5:
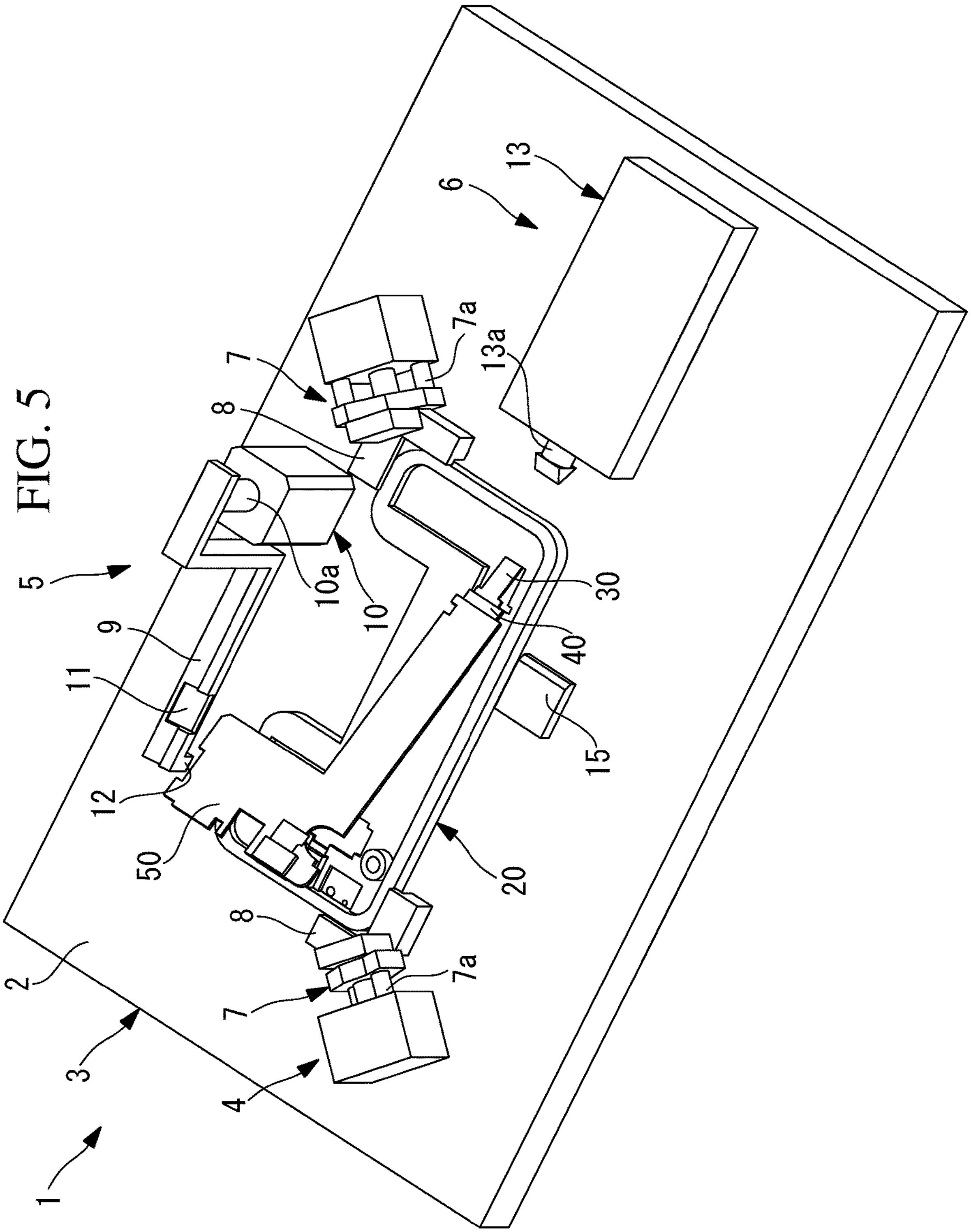
FIG. 5 is a perspective view illustrating a state in which the connector supporting unit is rotated from the state illustrated in FIG. 4 so as to take a retracted position.
Figure 6:
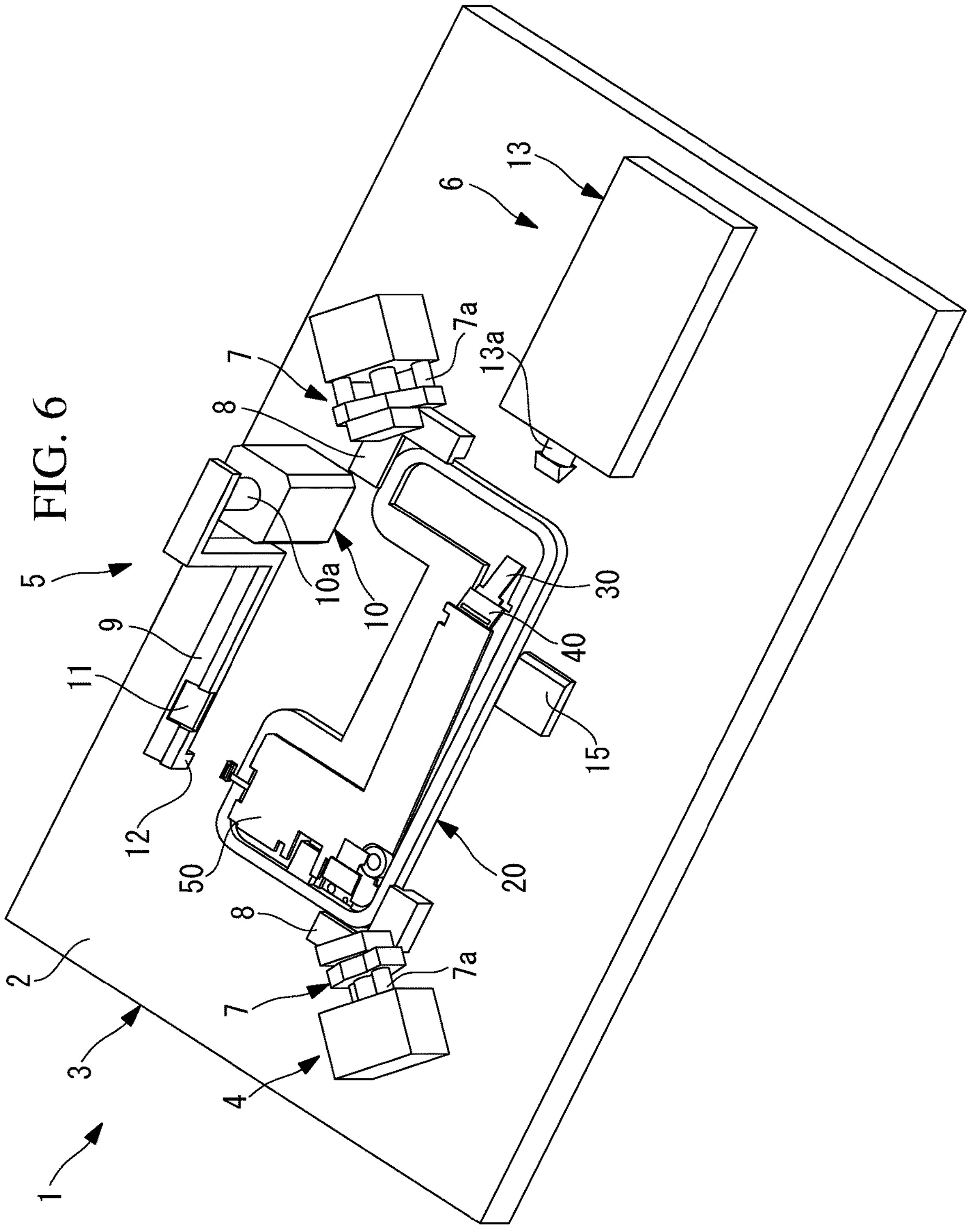
FIG. 6 is a diagram illustrating a task of housing a substrate after the state illustrated in FIG. 5.
Figure 7:
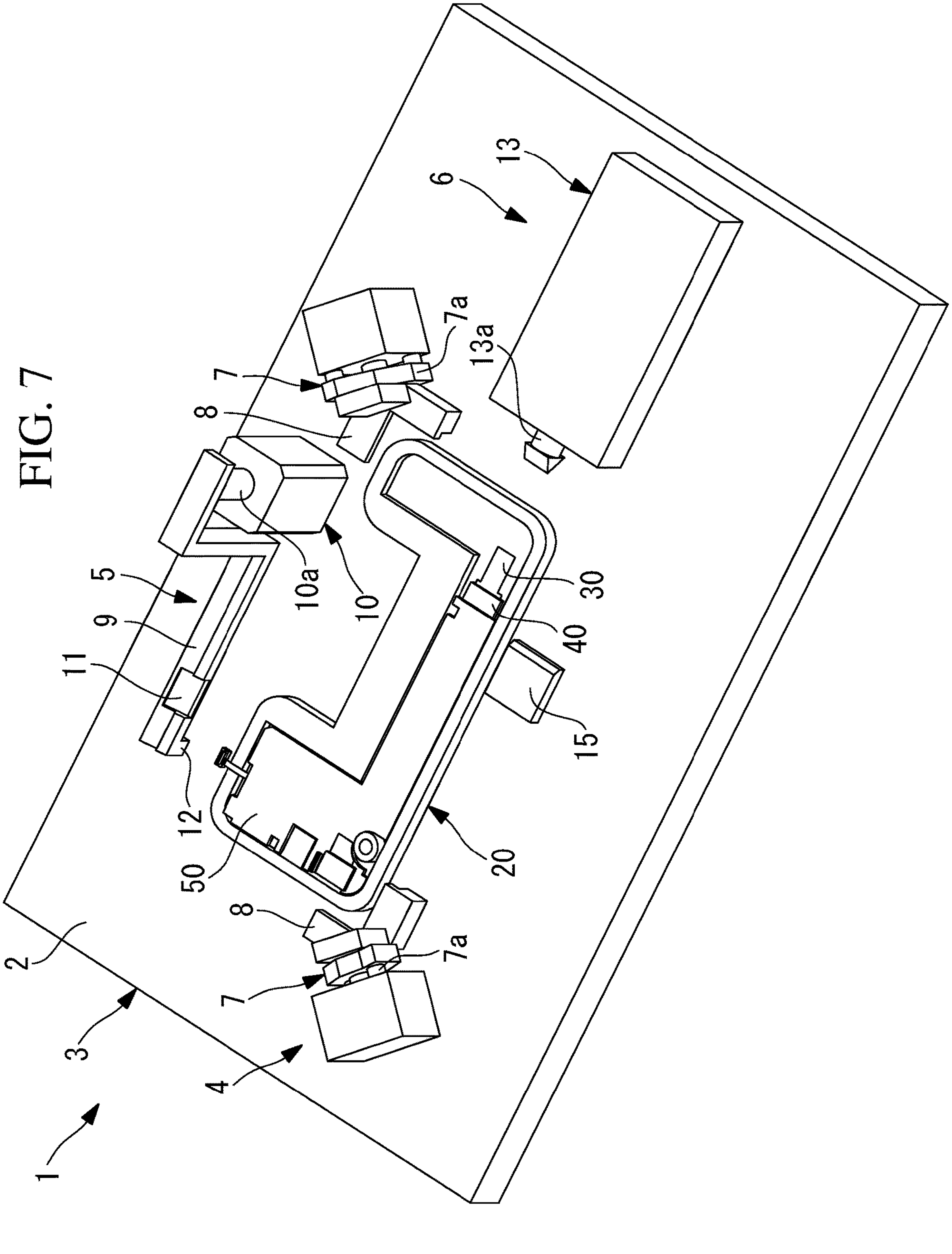
FIG. 7 is a diagram illustrating a state in which the substrate is housed in an electronic device casing.

After the first connector 40 is connected to the second connector 60 as such, the clamp cylinder 10 is actuated to lift the connector supporting member 9 upward. Then, as illustrated in FIG. 5, the connector supporting member 9 is returned to the retracted position by being rotated about the perpendicular axis. Thus, as illustrated in FIGS. 6 and 7, the substrate 50 can be housed in the electronic device casing 20 without being obstructed by the connector supporting member 9.

The contact surface 11 is inclined with respect to the horizontal plane, and the pushing force F in the horizontal direction is applied to the first connector 40 by the pusher cylinder 13. Alternatively, the contact surface 11 may be in a horizontal state, and the protraction-retraction direction of the pusher cylinder 13 may be sloped with respect to the horizontal plane.

In either case, as long as the force F acting in one direction applied to the first connector 40 by the pusher cylinder 13 has a component f1 in a direction along the contact surface 11 and a component f2 in a direction orthogonal to the contact surface 11, the position can be set in two directions by using one pusher cylinder 13.

Figure 8:
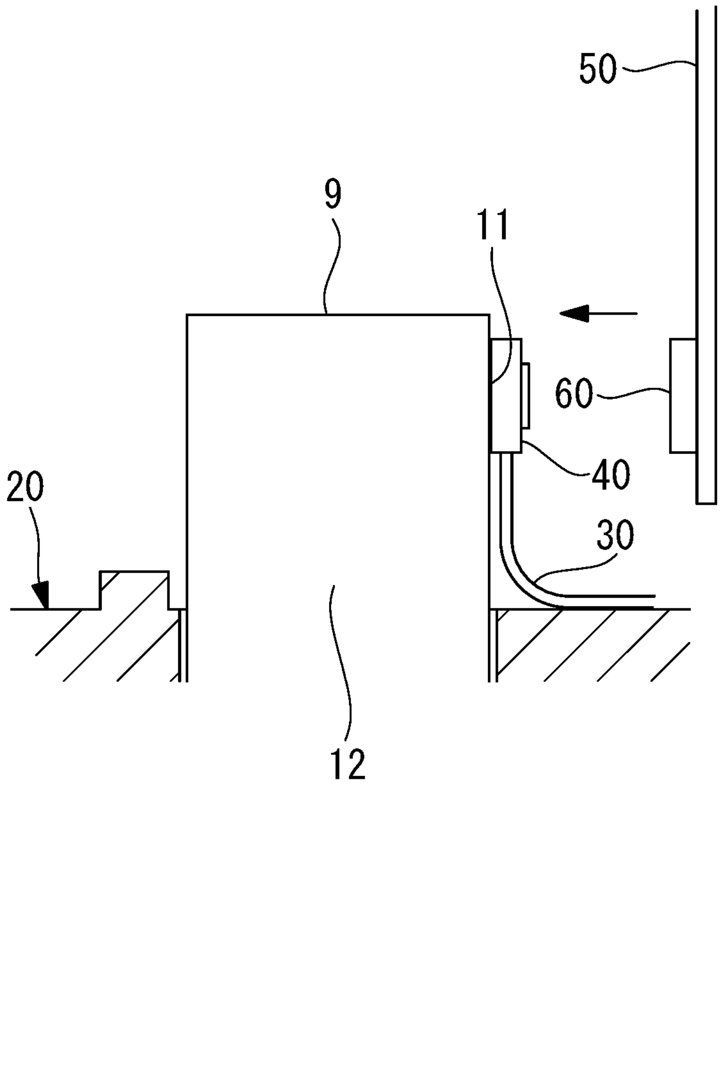
FIG. 8 is a side view illustrating a modification of the connector-connecting jig illustrated in FIG. 1.

In the connector-connecting jig 1 of the present embodiment, the contact surface 11 inclined with respect to the horizontal plane supports the rear surface of the first connector 40, and the second connector 60 is brought close to the first connector 40 from obliquely above. Alternatively, as illustrated in FIG. 8, the contact surface 11 may be arranged to extend in the perpendicular direction, and the second connector 60 may be brought close to the first connector 40 in the horizontal direction to establish a connection.

As a result, the following aspect is derived from the above described embodiment.

An aspect of the present invention provides a connector-connecting jig used to connect a first connector disposed at one end of a strip-shaped flexible cable, which has another end fixed to a bottom surface of a housing-shaped electronic device body, to a second connector on a substrate to be housed in the electronic device body. The first connector is disposed on a surface of the flexible cable opposite to said bottom surface when the flexible cable is in a housed state in which the flexible cable extends along said bottom surface. The connector-connecting jig includes a base having a placement surface on which the electronic device body is placed; a body fixing unit that fixes the electronic device body onto the placement surface so that the electronic device body is in a positioned state; and a connector supporting member that extends over the electronic device body with a space therebetween and contacts a surface of the flexible cable on a rear surface side of the first connector when the flexible cable is lifted upward from said bottom surface of the electronic device body fixed onto the placement surface.

According to this aspect, first, the electronic device body is placed on the placement surface of the base, and the body fixing unit is actuated to fix the electronic device body onto the placement surface so that the electronic device body is in a positioned state. Next, a strip-shaped flexible cable, which is housed along the bottom surface of the electronic device body, is lifted upward, and the connector supporting member is arranged to extend over the electronic device body with a space therebetween. As a result, the surface of the flexible cable on the rear surface side of the first connector can be supported while making contact with the connector supporting member.

In this state, when the second connector on the substrate to be housed in the housing-shaped electronic device body is pushed against the first connector, the first connector, which is supported by the connector supporting member on the rear surface side, is prevented from slipping away by the pushing force, and a connection can be reliably established. In other words, it becomes possible to support the substrate by using a robot and to connect the second connector to the first connector by using a robot while monitoring the pushing force through a force sensor, and the assembly can be automated. Since the connector supporting member is not in contact with the electronic device body, the pushing force for connecting the second connector is prevented from acting on the electronic device body, and the integrity of the electronic device body can be maintained.

In the aspect described above, the connector supporting member may be rotatably supported by the base about an axis extending in a direction intersecting said bottom surface so that, when rotated, the connector supporting member comes above the electronic device body and between said bottom surface and the surface of the flexible cable on the rear surface side of the first connector.

According to this structure, when connecting the second connector on the substrate to the first connector, the connector supporting member is rotated in one direction about the axis so that the connector supporting member comes between the bottom surface and the surface on the rear surface side of the first connector and so that the rear surface side of the first connector is supported. After the connection is established, the connector supporting member is rotated about the axis in the reverse direction so that the connector supporting member is retracted from the rear surface side of the first connector and the substrate can be housed in the electronic device body. Since this task involves only rotating the connector supporting member, automation is simple.

In the aspect described above, the connector supporting member may be movable along said axis and may have a supporting surface that is inclined in one direction with respect to the axis and contacts the surface of the flexible cable on the rear surface side of the first connector. In addition, when the connector supporting member is to be rotated about the axis, the connector supporting member may be moved to a position remote from the placement surface, and when the connector supporting member is to make contact with the flexible cable, the connector supporting member may be placed at a position where the connector supporting member contacts the placement surface.

According to this structure, when the connector supporting member is rotated, the connector supporting member is remote from the placement surface. Thus, the connector supporting member can be rotated without generating friction with the placement surface. Meanwhile, when the connector supporting member is placed on the rear surface side of the first connector, the connector supporting member is moved in the axis direction so that the connector supporting member contacts the placement surface.

In this manner, when the first connector is pushed so that the surface of the flexible cable on the rear surface side of the first connector contacts the supporting surface, the connector supporting member is pushed in the axis direction due to the axis-direction component of the pushing force applied to the supporting surface. However, since this force is received by the placement surface, the first connector can be stably supported. In other words, even when the second connector is pushed against the first connector to establish connection, the connector supporting member does not slip away, and, thus, the pushing force can be easily controlled through a force sensor installed in a robot to facilitate the task of connecting the first connector and the second connector.

In the aspect described above, the connector-connecting jig may further include a pushing member that pushes the first connector along an oblique direction with respect to the supporting surface of the connector supporting member so that the surface of the flexible cable on the rear surface side of the first connector contacts the supporting surface, and a locating surface formed in the connector supporting member and extending in a direction intersecting the supporting surface so that the pushed first connector abuts against the locating surface.

According to this structure, due to the component of the pushing force from the pushing member acting in a direction orthogonal to the supporting surface, the surface of the flexible cable on the rear surface side of the first connector contacts the supporting surface. Thus, the position of the first connector can be set in a direction orthogonal to the supporting surface. Due to the component of the pushing force acting in a direction along the supporting surface, the first connector moves and abuts against the locating surface extending in a direction intersecting the supporting surface. Thus, the position of the first connector can be set in a direction along the supporting surface also.

REFERENCE SIGNS LIST

1 connector connecting jig
2 placement surface
3 base
4 case fixing unit (body fixing unit)
9 connector supporting member
11 contact surface (supporting surface)
13 pusher cylinder (pushing member)
14 locating surface
20 electronic device casing (electronic device body)
30 flexible cable
40 first connector
50 substrate
60 second connector

The invention claimed is:

1. A connector-connecting jig used to connect a first connector disposed at one end of a strip-shaped flexible cable, which has another end fixed to a bottom surface of a housing-shaped electronic device body, to a second connector on a substrate to be housed in the electronic device body,
wherein the first connector is disposed on a surface of the flexible cable opposite to said bottom surface when the flexible cable is in a housed state in which the flexible cable extends along said bottom surface,
the connector-connecting jig comprising:
a base having a placement surface on which the electronic device body is placed;
a body fixing unit that fixes the electronic device body onto the placement surface so that the electronic device body is in a positioned state; and
a connector supporting member that extends over the electronic device body with a space therebetween and contacts a surface of the flexible cable on a rear surface side of the first connector when the flexible cable is lifted upward from said bottom surface of the electronic device body fixed onto the placement surface.

2. The connector-connecting jig according to claim 1, wherein the connector supporting member is rotatably supported by the base about an axis extending in a direction intersecting said bottom surface so that, when rotated, the connector supporting member comes above the electronic device body and positioned between said bottom surface and the surface of the flexible cable on the rear surface side of the first connector.

3. The connector-connecting jig according to claim 2, wherein the connector supporting member is movable along said axis and has a supporting surface that is inclined in one direction with respect to the axis and contacts the surface of the flexible cable on the rear surface side of the first connector, and
when the connector supporting member is to be rotated about the axis, the connector supporting member is moved to a position remote from the placement surface, and when the connector supporting member is to make contact with the flexible cable, the connector supporting member is placed at a position where the connector supporting member contacts the placement surface.

4. The connector-connecting jig according to claim 3, further comprising:
a pushing member that pushes the first connector along an oblique direction with respect to the supporting surface of the connector supporting member so that the surface of the flexible cable on the rear surface side of the first connector contacts the supporting surface, and
a locating surface formed in the connector supporting member and extending in a direction intersecting the supporting surface so that the pushed first connector abuts against the locating surface.

* * * * *